(12) United States Patent
Ma

(10) Patent No.: US 9,372,656 B2
(45) Date of Patent: Jun. 21, 2016

(54) VIDEO DISPLAY SYSTEM UTILIZING USB POWER DELIVERY INTERFACE FOR PROTECTED VIDEO CONTENT

(71) Applicant: Acer Incorporated, New Taipei (TW)

(72) Inventor: Chin-Shiang Ma, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 14/484,416

(22) Filed: Sep. 12, 2014

(65) Prior Publication Data

US 2015/0169276 A1 Jun. 18, 2015

(30) Foreign Application Priority Data

Dec. 16, 2013 (TW) .............................. 102146359 A

(51) Int. Cl.
*G06F 3/00* (2006.01)
*G06F 3/14* (2006.01)
*G06F 13/38* (2006.01)
*G06F 11/30* (2006.01)

(52) U.S. Cl.
CPC .......... *G06F 3/1423* (2013.01); *G06F 11/3041* (2013.01); *G06F 13/385* (2013.01); *G09G 2358/00* (2013.01); *G09G 2370/04* (2013.01); *G09G 2370/12* (2013.01)

(58) Field of Classification Search
None
See application file for complete search history.

(56) References Cited

U.S. PATENT DOCUMENTS

| | | | |
|---|---|---|---|
| 8,848,910 B2 * | 9/2014 | Mulcahy ............ | H04N 21/4627 380/200 |
| 2006/0123457 A1 | 6/2006 | Chen et al. | |
| 2012/0086777 A1 * | 4/2012 | Chen .................. | H04N 13/0022 348/46 |
| 2013/0286027 A1 * | 10/2013 | Desselle ................ | G09G 5/006 345/520 |
| 2014/0101345 A1 * | 4/2014 | Ranta .................. | G06F 13/4081 710/16 |

FOREIGN PATENT DOCUMENTS

CN 202856042 4/2013

OTHER PUBLICATIONS

Universal Serial Bus Power Delivery Specification; Revision 1.0; Published Jul. 26, 2013; pp. 1-328.*

* cited by examiner

*Primary Examiner* — Idriss N Alrobaye
*Assistant Examiner* — Richard B Franklin
(74) *Attorney, Agent, or Firm* — McClure, Qualey & Rodack, LLP

(57) ABSTRACT

A video display system is provided. The video display system includes: a first media device; and a second media device, wherein the first media device is connected to the second media device through a universal serial bus power delivery (USB PD) interface, and the first media device transmits both data and a protected video content to the second media device simultaneously through the USB PD interface, wherein the second media device displays the protected video content on a first electronic device through the USB PD interface.

4 Claims, 4 Drawing Sheets

Profile 0
Reserved

Profile 1
5V @ 2A

Profile 2
5V @ 2A, 12V @ 1.5A

Profile 3
5V @ 2A, 12V @ 3A

Profile 4
5V @ 2A, 12V, 20V @ 3A

Profile 5
5V @ 2A, 12V, 20V @ 5A

Profile 6

FIG. 3A

| Pin No | Signal Name |
|---|---|
| 1 | $V_{BUS}$ |
| 2 | D- |
| 3 | D+ |
| 4 | GND |
| 5 | StdA_SSRX- |
| 6 | StdA_SSRX+ |
| 7 | GND_DRAIN |
| 8 | StdA_SSTX- |
| 9 | StdA_SSTX+ |
| 10 | PD DETECT 1 |
| 11 | PD DETECT 2 |
| 12, 13 | INSERTION DETECT |
| Shell | Shield |

FIG. 3B

VIDEO DISPLAY SYSTEM UTILIZING USB POWER DELIVERY INTERFACE FOR PROTECTED VIDEO CONTENT

CROSS REFERENCE TO RELATED APPLICATIONS

This Application claims priority of Taiwan Patent Application No. 102146359, filed on Dec. 16, 2013, the entirety of which is incorporated by reference herein.

BACKGROUND OF THE INVENTION

1. Field of the Invention

The present invention relates to a video system, and in particular to a video display system capable of transmitting both video signals and data signals simultaneously by using a USB interface.

2. Description of the Related Art

If protected video content is to be displayed on a current video display system, a specific multimedia interface (e.g. HDMI or DisplayPort) is required for video/audio data transmission. However, a universal serial bus (USB) interface is usually equipped on most electronic devices (e.g. personal computers), so that it is convenient for the user to transfer data between the electronic device and a portable USB device. When a multimedia interface or a specific transmission interface having a larger data bandwidth is equipped, it may usually cost extra. Accordingly, there is a demand for a video display system capable of transmitting both the video/audio signals and data signals simultaneously by using the USB interface, so that a better user experience can be obtained.

BRIEF SUMMARY OF THE INVENTION

A detailed description is given in the following embodiments with reference to the accompanying drawings.

In an exemplary embodiment, a video display system is provided. The video display system includes: a first media device; and a second media device, wherein the first media device is connected to the second media device through a universal serial bus power delivery (USB PD) interface, and the first media device transmits both data and protected video content to the second media device simultaneously through the USB PD interface, wherein the second media device displays the protected video content on a first electronic device through the USB PD interface.

BRIEF DESCRIPTION OF THE DRAWINGS

The present invention can be more fully understood by reading the subsequent detailed description and examples with references made to the accompanying drawings, wherein:

FIG. 3A is a diagram illustrating the USB PD profiles in accordance with an embodiment of the invention; and FIG. 3B is a diagram illustrating the USB PD pins used in the integration interface 124 in accordance with an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
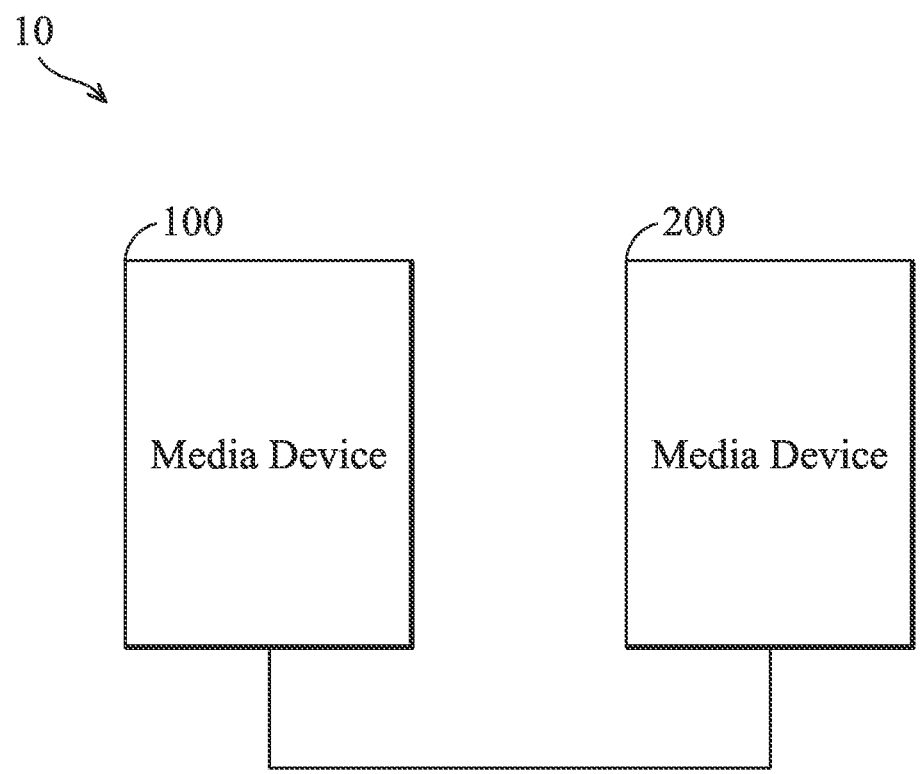
FIG. 1 is a simplified block diagram of a video display system 10 in accordance with an embodiment of the invention.

FIG. 1 is a simplified block diagram of a video display system 10 in accordance with an embodiment of the invention. As illustrated in FIG. 1, the video display system 10 may include a media device 100, and a media device 200, wherein the media device 100 and the media device 200 are connected to each other via the USB interface. In an embodiment, one of the media device 100 or the media device 200 can be regarded as a media provider or a source device, and the another one can be regarded as a media consumer or a sink device. For the purposes of description, the media device 100 is regarded as the source device, and the media device 200 is regarded as the sink device in the following embodiments. Briefly, the media provider may provide a media data stream and a high-definition digital content protection (HDCP) signal to the media consumer via the USB interface, and the media consumer may decode the media data stream to obtain images/videos, which are further displayed on a display unit.

Figure 2:
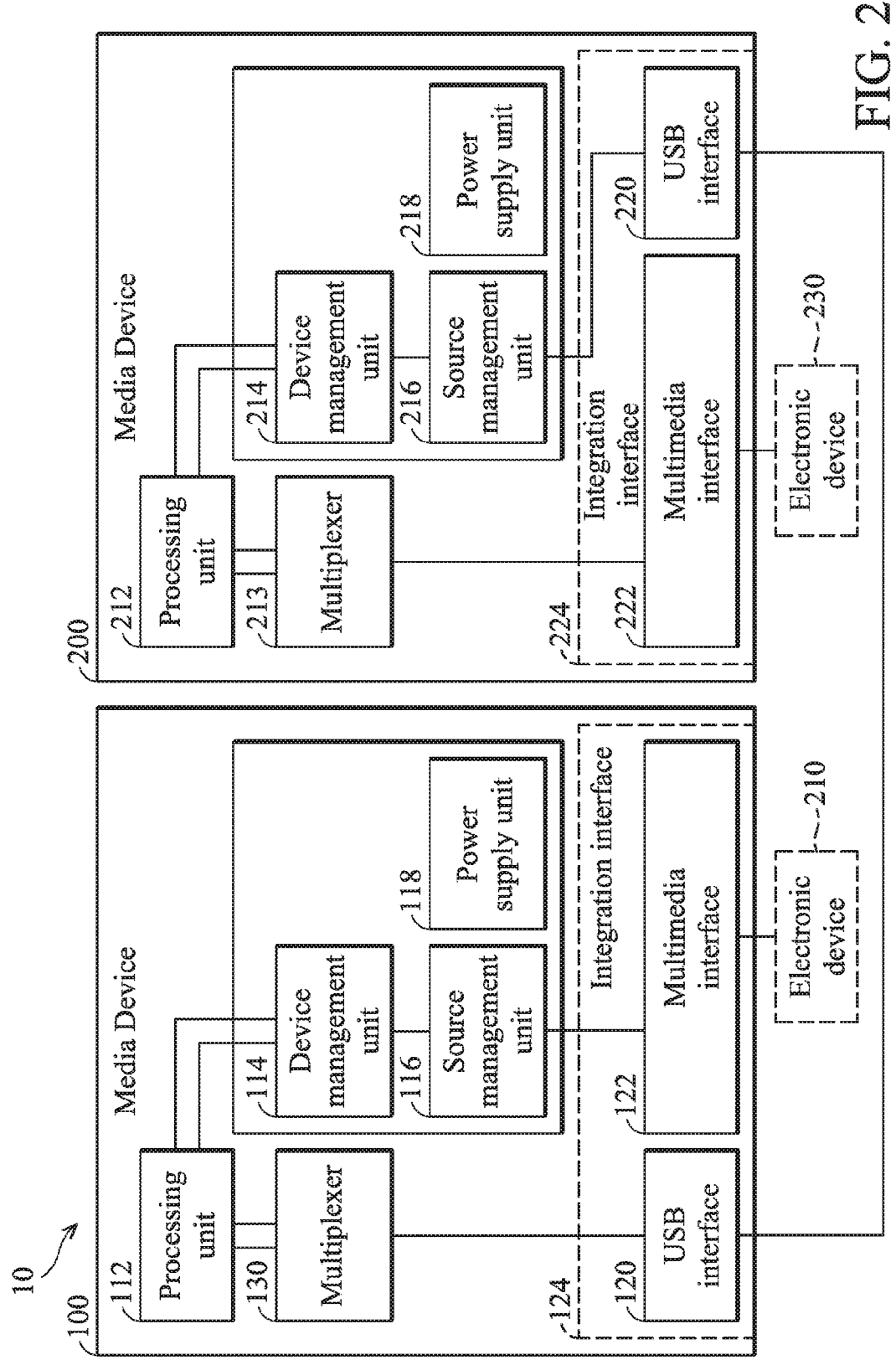
FIG. 2 is a detailed block diagram of the video display system 10 in accordance with an embodiment of the invention.

FIG. 2 is a detailed block diagram of the video display system 10 in accordance with an embodiment of the invention. As illustrated in FIG. 2, the media device 100 may include a processing unit 112, a device management unit 114, a source management unit 116, a power supply device 118, a USB interface 120, and a multimedia interface 122. The components 212~222 of the media device 200 correspond to those of the media device 100. In the following embodiments, each component of the media device 100 is described. For one having ordinary skill in the art, the details of each component of the media device 200 are appreciated, and the details will be omitted here. In an embodiment, the multimedia interface 122 complies with the HDMI and/or DisplayPort specification, and the USB interface 120 complies with the universal serial bus power delivery (USB PD) specification. In some embodiments, the multimedia interface 122 and the USB interface 120 may be integrated into an integration interface 124 (e.g. an interface supporting the USB PD specification). The power supply device 118 is configured to provide power sources to each component of the media device 110, and provide an operation voltage to the VBUS pin of the USB interface. The source management unit 116 is configured to receive a detection signal (e.g. a hot-plug signal) indicating whether any electronic device is plugged into the multimedia interface 122, or receive a detection signal (e.g. a USB PD detection signal) indicating whether any electronic device is plugged into the USB interface 120, and provide the detection signal to the device management unit 114. The device management unit 114 is configured to control the power supply device 118 to provide power to related components.

In addition, taking the DisplayPort specification as an example, the device management unit 114 may further determine whether the media device connected to the USB interface 120 is a video device supporting the USB PD specification or the HDCP specification. For example, the device management unit 114 may determine whether the media device 150 is connected to a video device supporting the USB PD specification. The device management unit 114 may further determine whether any electronic device is plugged into the multimedia interface 122. Furthermore, the device management unit 114 may further transmit the extended display identification data (EDID) of the electronic device (e.g. electronic device 210) connected to the USB interface 120 to the processing unit 112 through an auxiliary channel, and transmit a hot-plug detection signal to the processing unit 112, thereby informing the processing unit 112 whether an electronic device supporting the hot-plug function (e.g. complying with HDMI or DisplayPort specification) is plugged into the multimedia interface 122. In an embodiment, the device management unit 114 can be implemented by a microcontroller. In some embodiments, the multimedia interface 222 and the USB interface 220 may be integrated into an integration interface 224 (e.g. an interface supporting the USB PD specification). The multiplexer 130 may switch the output of the processing unit 112 between the USB 2.0 and DisplayPort lanes 0 and 1. Similarly, the multiplexer 213 may switch the output of the processing unit 212 between the USB 2.0 and DisplayPort lanes 0 and 1.

FIG. 3A is a diagram illustrating the USB PD profiles in accordance with an embodiment of the invention. As illustrated in FIG. 3A, profiles 0~5 are defined in the USB PD 1.0 specification, and each profile defines the operation voltage and current of the USB PD interface under different conditions. It should be noted that the operation voltage and current in some profiles are much larger than those in the USB 3.0/2.0 specifications. In addition, a profile 6 is further defined in the invention, and the operation voltage and current, which are used in the integration interface 124 for transmitting data and the protected video content, can be defined by the user. The device management unit 114 may know when to switch to high-speed transmission, receive the EDID, and transmit HDCP data according to the profile 6.

FIG. 3B is a diagram illustrating the USB PD pins used in the integration interface 124 in accordance with an embodiment of the invention. As illustrated in FIG. 3B, there are 14 pins defined in the USB PD 1.0 specification, which are pin no. 1~13 and pin "shell", wherein each pin has a corresponding signal name. It should be noted that there are only four pins (e.g. pins 1~4), which are VBUS, D−, D+ and GND, defined in the USB 2.0 specification, and the four pins are used for non-high-speed transmission. Furthermore, pins 10 and 11 defined in the USB PD specification are the detection pins PD DETECT 1 and PD DETECT 2, respectively. The media devices 100 and 200 detect whether the connected USB device supports the USB PD specification via the detection pins. In addition, the pins 12 and 13 defined in the USB PD specification are originally used for detecting whether any USB device is plugged into the USB interface 120. The source management unit 116 may transmit the corresponding detection signals from the detection pins to the device management unit 114. Afterwards, the device management unit 114 may transmit the EDID of the connected electronic device, the HDCP signal, and the hot-plug detection signal to the processing unit 112 via the auxiliary channel defined in the DisplayPort specification. Similarly, the processing unit 112 may also transmit the HDCP signal to device management unit 114 through the auxiliary channel, and the device management unit 114 may transmit the HDCP signal to the media device 200 through the USB interface 120.

It should be noted that the pins 10 and 11 defined in the USB PD specification are no longer used after detecting whether the connected USB device supports the USB PD specification. After detecting whether the connected USB device supports the USB PD specification, the media device 100 may use pins 5-9 defined in the USB PD specification as the data transmission pins defined in Lane 0 and Lane 1 of the DisplayPort specification, so that the video data can be transmitted to the electronic device 210 for display at a high transmission speed (e.g. 720P@30 fps). The processing unit 112 may only receive the standard EDID data and the detection signal of the USB PD device, and no extra determination mechanism is required. Specifically, when the processing unit 112 transmits both data and the protected video content via the integration interface 124, the data can be transmitted via the pins defined in the USB 2.0 specification, and the video content, which has a corresponding HDCP signal, can be transmitted with Lane 0 and Lane 1 in the DisplayPort specification via pins 5-9 defined in the USB PD specification, where Lane 0 and Lane 1 indicate a signal differential pair.

In an embodiment, for example, the media device 200 may be a portable USB video box including a USB 3.0 or USB 2.0 interface, a HDMI interface, and/or a DisplayPort interface. The media device 200 may detect whether any electronic video device (e.g. electronic device 230) is plugged into the HDMI or DisplayPort interface. For example, the device detection pins (e.g. PD DETECT 1 and PD DETECT 2) and insertion detection pin (e.g. INSERTION DETECT) can be used. The processing unit 212 of the media device 200 may obtain the EDID of the electronic device 230 via the auxiliary channel. Since the media device 200 is connected to the media device 100 via the USB PD interface, the processing unit 212 of the media device 200 may further transmit the EDID of the electronic device 230 to the processing unit 112 via the USB PD interface (e.g. via the VBUS pin). Meanwhile, when the processing unit 112 of the media device 100 determines that the protected video content can be transmitted to the media device 200 at a high speed, the processing unit 112 may transmit the protected video content to the media device 200 at a high speed via the high speed transmission and reception pins (e.g. pins 5~9 shown in FIG. 3B), and transmit the HDCP signal required in the decoding process via the VBUS pin. Subsequently, the processing unit 212 of the media device 200 may transmit the received HDCP signal and the protected video content to the electronic device 230 for decoding and displaying.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A video display system, comprising:
a first media device; and
a second media device, wherein the first media device is connected to the second media device through a universal serial bus power delivery (USB PD) interface, and the first media device transmits both data and a protected video content to the second media device simultaneously through the USB PD interface,
wherein the second media device displays the protected video content on a first electronic device through the USB PD interface,
wherein the first media device comprises:
a first processing unit;
a device management unit; and
a source management unit,
wherein the device management unit obtains an extended display identification data (EDID) of the first electronic device through the USB PD interface, and transmits the EDID to the first processing unit through an auxiliary channel
wherein the first processing unit transmits a high-definition content protection (HDCP) signal to the device management unit through the auxiliary channel, and the device management unit transmits the HDCP signal to the second media device through the USB PD interface, wherein the first processing unit uses a VBUS pin of the USB PD interface to transmit the HDCP signal to the second media device.

2. The video display system as claimed in claim 1, wherein the first electronic device supports the DisplayPort specification.

3. The video display system as claimed in claim 1, wherein after the source management unit uses a first power delivery detection pin and a second power delivery detection pin of the USB PD interface to detect whether a second electronic device supports the USB PD specification, the first processing unit uses high-speed transmission pins and high-speed reception pins of the USB PD interface to transmit the protected video content to the second electronic device.

4. The video display system as claimed in claim 1, wherein the source management unit further detects whether a second electronic device is plugged into the USB PD interface of the first media device, wherein when it is detected that the second electronic device is plugged into the USB PD interface of the first media device, the source management unit further transmits a hot-plug detection signal to the first processing unit.

* * * * *